J. SHARPE.
CASH REGISTER.
APPLICATION FILED JULY 20, 1898. RENEWED APR. 2, 1903.

907,417.

Patented Dec. 22, 1908.

6 SHEETS—SHEET 1.

Witnesses.

Inventor.

J. SHARPE.
CASH REGISTER.
APPLICATION FILED JULY 20, 1898. RENEWED APR. 2, 1903.

No. 907,417.

Patented Dec. 22, 1908.

J. SHARPE.
CASH REGISTER.
APPLICATION FILED JULY 20, 1898. RENEWED APR. 2, 1903.

907,417.

Patented Dec. 22, 1908.

6 SHEETS—SHEET 3.

Witnesses
Egerton R. Case
Oscar Groulx

Inventor:
John Sharpe
by Fetherstonhaugh & Co.
attys.

J. SHARPE.
CASH REGISTER.
APPLICATION FILED JULY 20, 1898. RENEWED APR. 2, 1903.
907,417.
Patented Dec. 22, 1908.
6 SHEETS—SHEET 4.
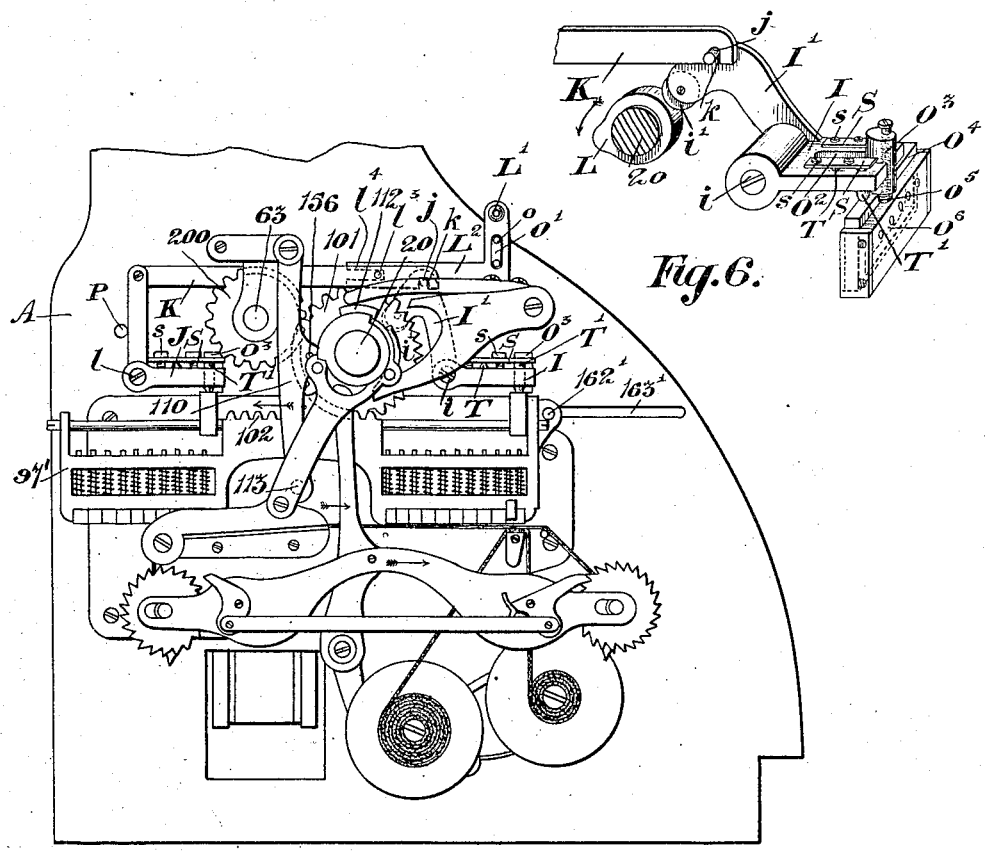
Fig. 6.
Fig. 4.
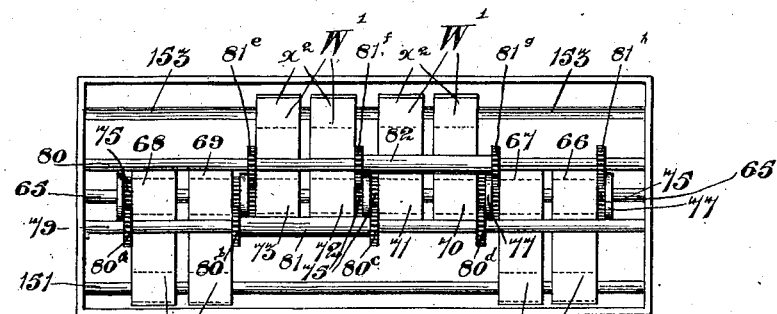
Fig. 12.
Witnesses
Inventor.
John Sharpe J. SHARPE.
CASH REGISTER.
APPLICATION FILED JULY 20, 1898. RENEWED APR. 2, 1903.
907,417.
Patented Dec. 22, 1908.
6 SHEETS—SHEET 5.
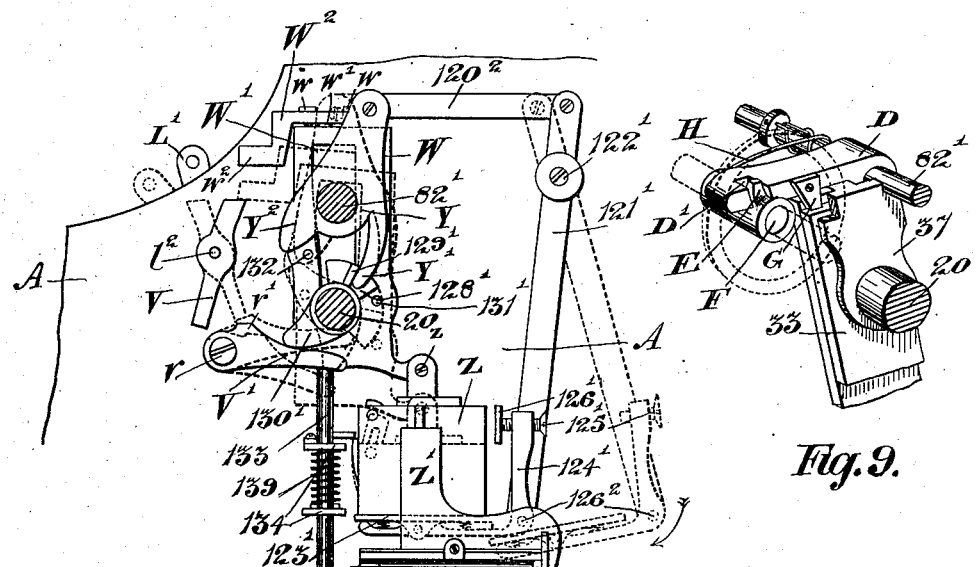
Fig. 9.
Fig. 5.
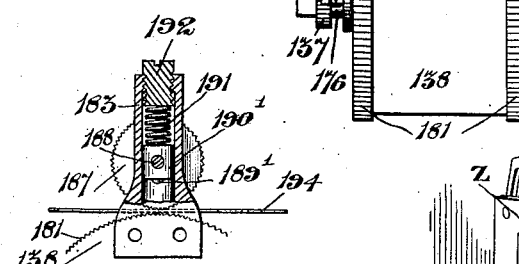
Fig. 8.
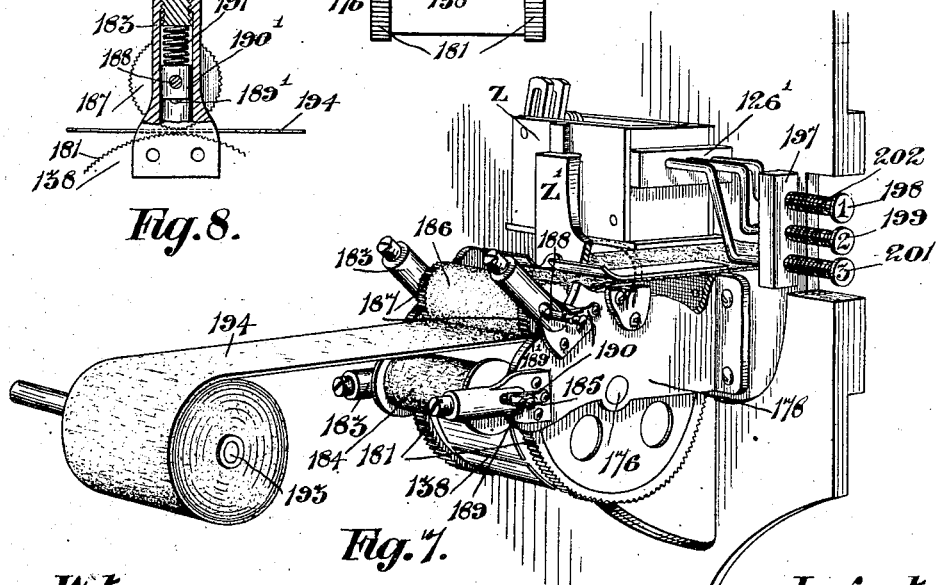
Fig. 7.
Witnesses.
Inventor.
John Sharpe
by Fetherstonhaugh & Co.
attys.

J. SHARPE.
CASH REGISTER.
APPLICATION FILED JULY 20, 1898. RENEWED APR. 2, 1903.
907,417.
Patented Dec. 22, 1908.
6 SHEETS—SHEET 6.
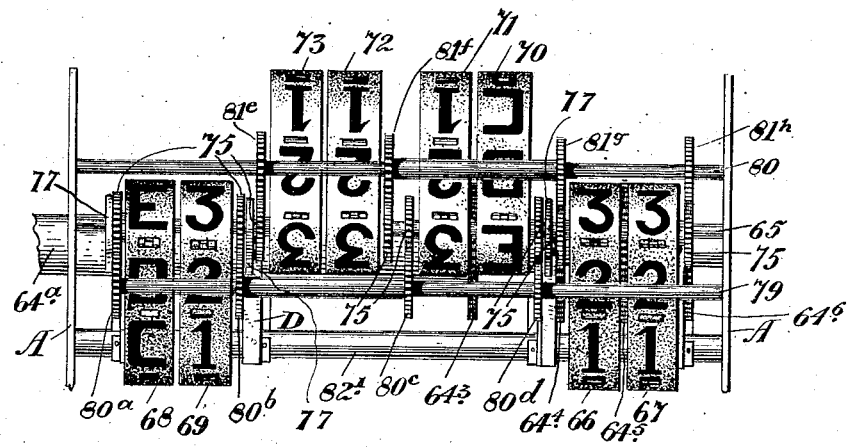
Fig. 13.a
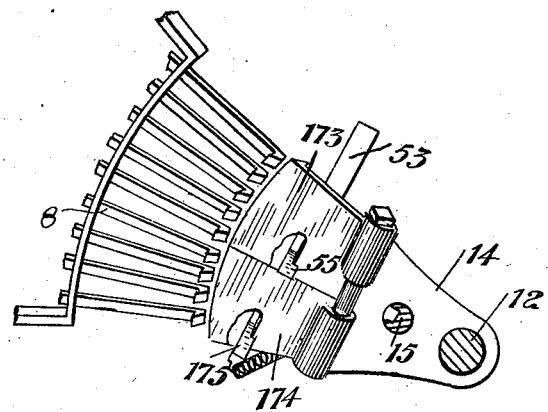
Fig. 11.a

UNITED STATES PATENT OFFICE.

JOHN SHARPE, OF OTTAWA, ONTARIO, CANADA, ASSIGNOR, BY MESNE ASSIGNMENTS, TO THE NATIONAL CASH REGISTER COMPANY, OF DAYTON, OHIO, A CORPORATION OF OHIO, INCORPORATED IN 1906.

CASH-REGISTER.

No. 907,417.   Specification of Letters Patent.   Patented Dec. 22, 1908.

Application filed July 20, 1898, Serial No. 686,434. Renewed April 2, 1903. Serial No. 150,844.

*To all whom it may concern:*

Be it known that I, JOHN SHARPE, a subject of the Queen of Great Britian, residing at Ottawa, in the county of Carleton, Province of Ontario, Canada, have invented certain new and useful Improvements in Cash-Registers, (applications for which, embodying the majority of the improvements shown in this application, have been filed in the following countries, namely, in Great Britain on December 20, 1897, under No. 30,097, and in Germany on the 16th of April, 1898, under No. S. 11,315/f.,) of which the following is the specification.

My invention relates to improvements in cash registers, and is a further improvement on the machine embodied in Patent No. 638286 granted to me the 5th day of Dec. 1899, and the object of my invention is, firstly, to provide a machine by means of which all transactions are shown and exposed on two sets of movable indicator bands, corresponding in number with the banks of keys, and bearing on their surfaces, indicia, corresponding with the indicia on the finger pieces of the several key rods. Secondly, to provide an improved means for operating the type for printing the detail slips, and the mechanism for printing the checks, and also to improve the construction of the mechanism operating between the key banks and the main shaft, as hereinafter more particularly explained.

Figure 1:
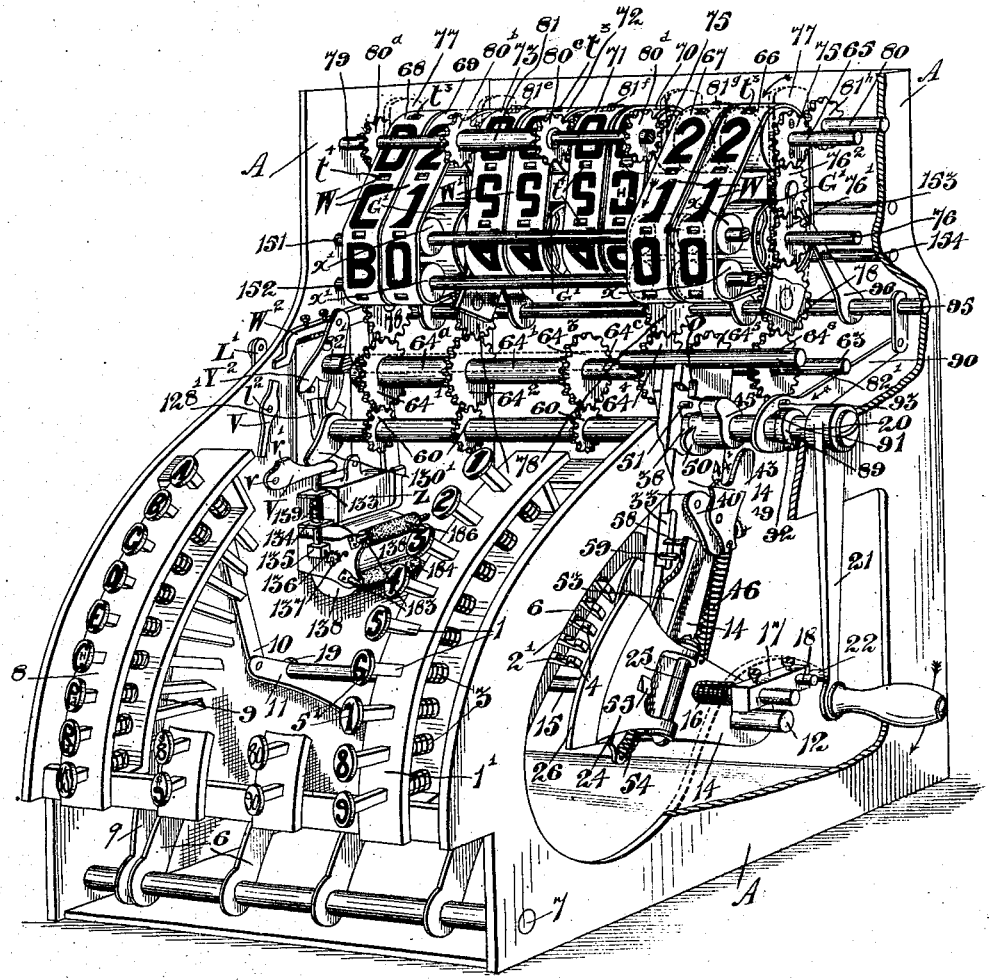
Figure 2:
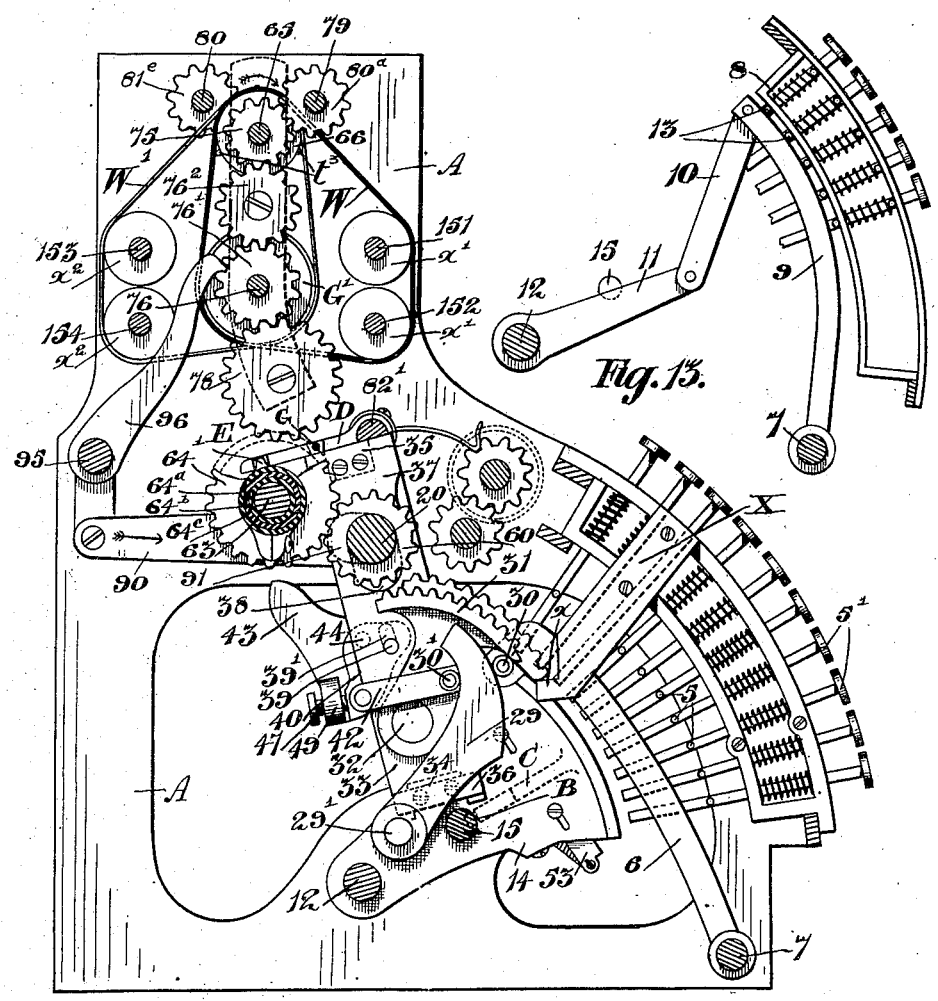
Figure 3:
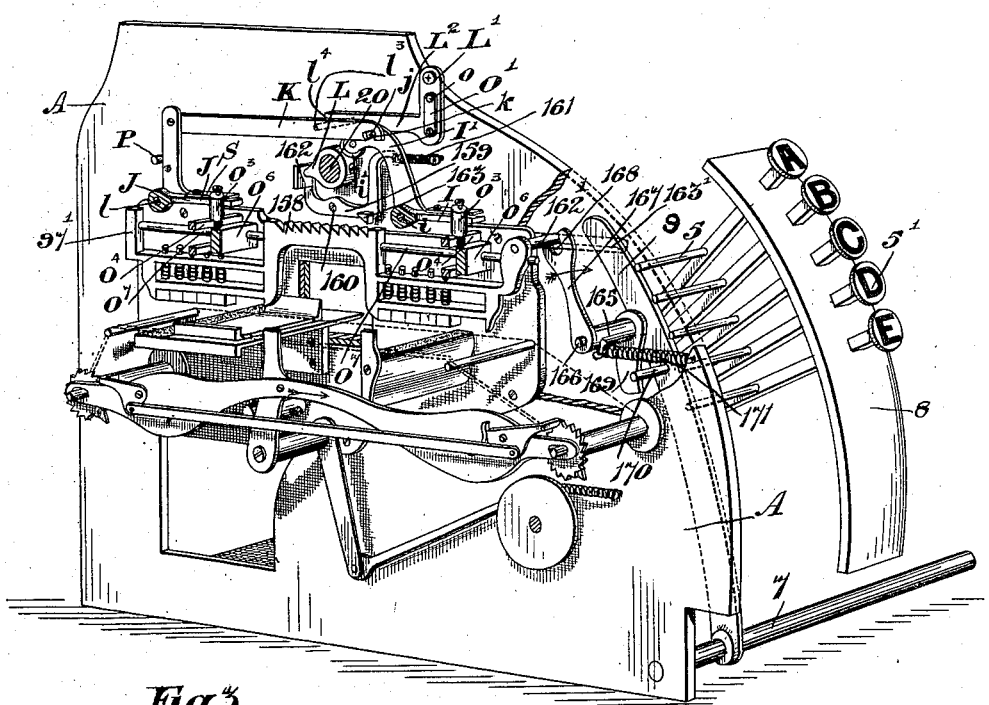
Figure 10:
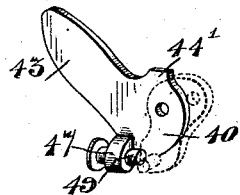
Figure 11:
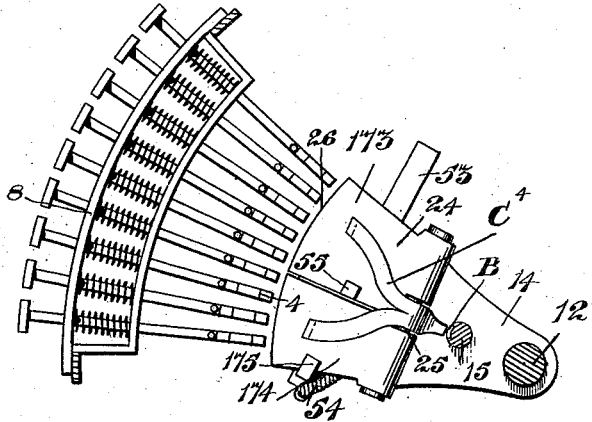

Figure 1, is a perspective view of my machine, parts being removed showing the mechanism for operating the indicator bands and the mechanism for printing the checks. Fig. 2, is a side elevation partially in section, looking at the left hand side of the machine. Fig. 3, is a perspective view, partially in section, showing the mechanism operated from the last bank of keys, for operating a special type-frame. Fig. 4, is an end view of the printing mechanism on the outside of the left hand side of the machine, showing the mechanism for operating the type-bars. Fig. 5, is an enlarged view of the printing mechanism shown in Fig. 1, showing the operation of the parts. Fig. 6, is a perspective view of one of the rocking frames for depressing the type-bars. Fig. 7, is a perspective view of the lower part of the mechanism shown in Fig. 5, showing the mechanism for supporting the ink roller pad and the paper-feed roller. Fig. 8, is an enlarged sectional view, showing the construction of the bearing supports shown in Fig. 7. Fig. 9, is a perspective view of the device for locking the indicator bands after an operation. Fig. 10, is a perspective view of one of the rocking levers showing the means by which it is adjusted. Fig. 11, is a side view of the divided detent operating in connection with the last bank of keys. Fig. 12, is a top view of the indicating mechanism, showing the means for transmitting motion from the main sets to the secondary sets of indicator bands. Fig. 13, is a side view of the mechanism operated from the special bank, for unlocking the machine. Figs. 11$^a$ and 13$^a$ show details of construction.

In the drawings, like letters of reference indicate corresponding parts in each figure.

In this machine, as in the one described in the patent above mentioned, I use four banks of key rods, which are supported at the front of the machine, as will be clearly understood from the patent. The inner ends 4 of the key rods 1, are hook shaped. Near the lower end of the key rods are stop pins 2$^1$.

3 are the return springs on the several key rods.

6, is a rock-lever loosely journaled on the rod 7, secured in the standard plates. The rock-lever 6 extends backwardly and rearwardly into the path of movement of the several laterally projecting pins 5 secured to the several key rods.

8 is a special bank of keys provided with a rock-lever 6, and also an extra rock-lever 9, connected by a link 10, to an arm 11, journaled on the rod 12.

14 are plates rigidly secured to the rod 12, which is securely fastened in the standard plates.

15 is a rod loosely supported in the plates 14, and provided with a spring 16. On the right hand end of the rod 15, is secured a stop-block 17, provided with a pin 18. The pin 18 and the end of the rod 15, project through the outer casing, which is shown as removed.

19 is a hole in the standard plate, at the left hand side of the machine, in the path of movement of the left-hand end of the rod 15.

20 is the main shaft of the machine, which, passing through near the upper ends of the plates 14, is journaled in the standard plates AA. This shaft is provided with a handle 21, on its right hand end. Near the lower end of the handle, is a pin 22, normally in contact with the pin 18.

The plates 14 have pivotally secured to their sides, by pins 25, as fully described in the prior patent, detents 24, the beveled projecting ends 26, of which, normally extend over the ends of the plates 14. These detents are in the path of movement of the several key rods.

29 is a lever pivoted at $29^1$.

On reference to Fig. 2, it will be seen that the front side of the lever 29 is curved and abuts the roller 30, secured to the rock-lever 6. 31 is a tooth-segmental rock-lever pivoted at 32, to the sliding plate 33. $30^1$ is a roller against which the rear curved side of the lever 29 rests.

X is a stop suitably secured to the side of the frames supporting the key banks. The lower end of this stop is cut away at $x$, and receives the forward end of the tooth-segmental rock-lever 31. In the position shown in Fig. 2, it will be noticed that the rock-lever 6 is curved rearwardly from the key banks, and that the pins 5 on the key rods, are at different distances from such rock-lever. This arrangement is planned upon the throw to be given the segmental rock-levers 31, by the depression of their respective keys, the key 9 throwing the tooth-segmental rock-lever, 9 teeth, while the next throws it 8 teeth, and so on up to the first, which throws the tooth-segmental rock-lever 31, only one tooth rearward.

Although not necessary to fully describe it in this application, the detents are provided with the arm C, (see Fig. 2) which operate in combination with the notches B, in the rod 15, as fully described in the above mentioned patent. This is the mechanism for preventing the operation of any key rod, after the machine has once started to be operated.

The sliding-plates 33 have their upper and lower ends recessed, as shown at 34 and 35, so as to be held in position next to the upwardly extending plates 14, by their brackets 36 and 37, (see Fig. 2).

38 is an elongated slot in the sliding-plate 33 through which the main shaft passes. By means of this slot, the sliding-plates have movement in the direction of their own length. Each sliding-plate has pivoted to it by pin 39, extending through the slot $39^1$, in the plate 14, the lever 40, one arm of which is connected by the link 42, with the forward side of the toothed-segmental rock-lever 31.

43 is a rock-lever pivoted to the lever 40 by a pin 44.

46 is a spring connecting the rock-lever 43 with the plate 14. On reference to Fig. 10, it will be seen that the rock-lever 43 is provided with a projection 47, through which passes a screw 49, the end of which abuts a square portion on the lever 40. The object of this screw is to regulate the distance of the upper end of the rock-lever 43, from the main shaft.

$44^1$ is a square shoulder on the rock-lever 43.

51 is a pin secured to the sliding-plate 33, extending through the slot 0, in the plate 14, into the path of movement of a cam 50, secured to the main shaft.

53 is a slide, provided at its upper end with a beveled edge-pin 58, which is in the path of movement of the beveled edge-pin 59, secured to the sliding-plate 33. This slide is provided with a beveled lug 55, operating in a similarly constructed surface in the detent 24, as is fully described in the patent.

54 is a spring connecting the lower end of the slide 53, to the plate 14.

60 are a series of idler pinions on the main shaft 20. These idler pinions are arranged in alinement and to mesh, with the segmental rock-levers 31.

63 is a shaft secured in the standard plates AA, parallel with the main shaft. This shaft is provided with a series of independent sleeves, $64^a$, $64^b$, and $64^c$. These sleeves are provided with gear wheels as follows; to the sleeve $64^a$, is secured a gear wheel $64^1$, to the sleeve $64^b$, is secured a gear wheel $64^2$ and to the sleeve $64^c$, are secured gear wheels $64^3$ and $64^4$, while to the shaft 63 are secured gear wheels $64^5$ and $64^6$. The sleeves on the shaft 63 extend out through the left hand side of the machine, and have each secured to their ends, gear wheels 200. The shaft 63 has also a gear wheel 200 secured to its end.

101 are part gear and part serrated wheels, loosely journaled on the left hand end of the main shaft 20.

The geared portion, as is fully described in the aforesaid patent, is in continuous mesh with the racks 102, on the type frames 97.

65 is a bearing rod near the top of the machine, secured in the standard plates. On the bearing rod 65, are loosely journaled a series of two sets of revoluble drive rollers, four of which are arranged in pairs of two at each side of the machine, while the remaining four are grouped together in pairs of two, in the center of the machine. (See Figs. 1 and 12).

The rollers 66 and 67, at the right hand side of the machine, and the rollers 68 and 69, at the left hand side of the machine, are the main drive rollers from which the rollers, 70, 71, 72 and 73 obtain their movement. Loosely journaled on the bearing rod 65, and secured to one side of each drive roller, are pinions 75.

76 is a bearing rod supported in the standard plates AA. To this rod are secured a number of supporting frames 77, which are also secured on the bearing-rod 65. Near the lower end of each supporting frame, are loosely journaled, the idlers 78, which are arranged in alinement and in mesh with four of the gear wheels on the shaft 63, (see Fig. 1). Loosely journaled on the bearing rod 76, are a series of idler rollers $G^1$, which correspond in number and are grouped in the same manner as the drive rollers on the bearing rod 65. Loosely journaled on the bearing rod 76, and adjacent to the supporting frames 77, and operating in combination with the pinions 75, secured to the main sets of drive rollers, and connected thereto by means of idlers $76^2$, loosely journaled in the supporting frames 77, are idler pinions $76^1$, which are in constant mesh with the idlers 78.

151 and 152 are two parallel dead-shafts secured in the standard plates AA. Secured in pairs of two near the right hand side of the machine, on the dead-shafts 151 and 152, are idler rollers $x$. Similarly grouped together and, on the same dead-shafts, and near the left hand side of the machine, are idler rollers $x^1$.

Loosely journaled on the dead shafts 153 and 154, at the back of the machine, and corresponding in number with the idler rollers on the dead shafts 151 and 152, and operating in alinement with the drive-rollers grouped in the center of the machine, are a series of idler rollers $x^2$ (see Figs. 2 and 12).

The above described idler-rollers are for the purpose of guiding and keeping taut, the indicator bands.

The main indicator bands W, are grouped in pairs of two at the right and left hand sides of the machine, and have inscribed upon their surfaces, indicia, corresponding with the indicia shown on the finger pieces of the several key rods. These indicator bands expose the amount on the front side of the machine, through suitable openings.

The secondary sets of indicator bands, $W^1$, are grouped in pairs of two, in the center of the machine. These indicator bands have similarly inscribed upon their surfaces, indicia, corresponding with the indicia inscribed upon the main sets of indicator bands. These secondary sets of indicator bands, expose the same amount at the rear side of the machine, as is exposed at the front side of the machine by the main indicator bands.

On reference to Fig. 1, it will be seen that the drive-rollers are provided on their peripheries, with suitable drive pins $t^3$, which operate in alinement with punched holes $t^4$, in the indicator bands. By these means it will be seen that as the drive rollers are operated, as hereinafter described, the drive pins $t^3$ will operate in the holes $t^4$, and move the indicator bands.

The mechanism which I employ for transmitting motion from the main sets of drive-rollers, to the secondary sets of drive-rollers, is identical to that employed by me for transmitting motion from the main sets of indicator wheels to the secondary sets of indicator wheels, fully described in my before mentioned patent.

Secured to, or on the shaft 79, are a series of idler pinions $80^a$, $80^b$, $80^c$ and $80^d$, which mesh respectively with the pinions secured to the main drive-rollers 68 and 69, and the secondary drive-rollers 71 and 70.

Secured to, or on the shaft 80, are a series of idler pinions, $81^e$, $81^f$, $81^g$ and $81^h$, which mesh respectively with the pinions secured to the main drive-rollers 73 and 72, and the secondary drive-rollers 67 and 66. As described in the said patent, the pinions $80^b$ and $80^c$, are connected together by the sleeve 81; and the pinions $81^f$ and $81^g$, are connected together by the sleeve 82. (See Figs. 1 and 12.)

I employ the same detent 96, secured to the rock-shaft 95, operated by the arm 90 on the main shaft, by means of the cam 89, and the pins 92 and 93, to engage with the pinions $76^1$, and lock the indicator bands in position after an operation. The operation of this detent is fully described in my before mentioned patent.

On reference to Figs. 2 and 9, the construction of my device for locking the wheels secured to or on the shaft 63, after the indicator bands have been returned to starting position, before indicating the new transaction, will be seen.

D is an arm loosely journaled on the dead-shaft $82^1$. Near the free end of the arm D is a slot $D^1$.

E is a lug secured to a hub F, and normally resting in the slot $D^1$.

It will be understood that the hubs F form part of the several wheels on the shaft 63.

G is a piece secured to or forming part of the arm D, and resting on the top of the sliding-plate 33.

H is a spring suitably secured at one end to the dead shaft $82^1$ and at the other end, to the free end of the arm D. The object of this spring is to return the arm D to normal, after an operation. It will of course be understood that the wheels $64^1$ and $64^2$ have their hubs provided with one of these lugs E, and that the wheels $64^3$ and $64^4$, being secured to the same sleeve, have one lug, as have also the wheels $64^5$ and $64^6$, which are secured to the shaft 63. By means of these lugs, the wheels are prevented from rotating, by the arm D above described.

On reference to Figs. 3, 4 and 6, will be seen the construction of the rocking-frame for operating the rectangular plungers which depress the type.

I is the front rocking-frame, and J is the rear rocking-frame. Each rocking-frame is secured to the standard plate at the left hand side of the machine, by pins $i$ and $l$ respectively.

K is a link-arm, connecting the rocking-frame I with the rocking-frame J.

$k$ is a slot, near the front of the link-arm K, which engages with the pin $j$, secured to the rocking-frame I, when both rocking-frames are in operation.

$I^1$ is an upwardly extending arm forming part of the rocking-frame I and provided at its end, with a roller $i^1$, which bears against the cam L, secured to the main shaft 20. Each rocking-frame is provided with an elongated slot $O^2$. Into each of these slots extends an extension $O^3$, of the rectangular plungers $O^4$. Each extension $O^3$, is provided with a spring $O^5$, which rests upon the bearing-block $O^6$.

S, S, are two adjustable pieces, secured by the screws $s, s$, to the rocking-frames on each side of the elongated slot $O^2$.

T are lugs secured to either the pieces S, S, or the rocking-frames.

$T^1$ are plunger points operating in the rocking-frames near their outer ends and resting normally with their lower ends on the rectangular frames and their upper ends abutting the pieces S, S. It will of course be understood, that each rocking-frame is provided with two plunger-points, one on each side of the rectangular slots $O^2$.

The object of the lugs T is to enable the tension of the pieces S, S on the plunger points, $T^1$, to be regulated as follows: It will readily be seen that when the rear screws are loosened, the front screws will increase the pressure of the pieces SS, upon the plunger-points, as the rear ends of the pieces SS, being loosened, they will tilt over the lugs T, and throw their outer ends down upon the plunger-points. It will be understood that this will diminish the distance that the plunger-points will have to be depressed, when depressing the type, and will consequently increase the pressure of the type upon the paper. It will of course be understood that if the front screws are loosened, and the rear ones not touched, that the pressure of the ends of the pieces S, upon the plunger-points, will be lessened and the type consequently will not be pressed upon the paper with as much pressure as when the pieces are set as before described.

$L^1$ is an arm pivoted at $l^2$, (see Figs. 4 and 5). The rearwardly extending portion $L^2$, of the arm $L^1$, is provided at its end, with a slot $l^1$, in which operates the pin $l^3$ secured to the link-arm K. The spring-catch $O^1$ secured to the arm $L^1$, is provided with a pin $o$, extending into a notch in the side of the standard plate.

P, is a stop pin secured in the standard plate, to prevent the rocking-frame J, from moving in the wrong direction.

I shall now describe the construction and operation of the special type-frame, operating in combination with the bank of keys 8, shown in Fig. 3.

$97^1$ is the type-frame which is provided with a serrated rack 158. This type-frame is suitably journaled in the bearing blocks $6^6$, by the bearing rods $0^7$, as shown.

159 is a bell-crank pivoted at 160 to the outside of the standard plate, at the left hand side of the machine.

162 is a projection secured to, or forming part of the end of the bell-crank 159, and is in the path of movement of the cam L.

163 is a tooth-shaped lug secured to the lower forward end of the bell-crank 159.

Near the front end of the frame $97^1$, is secured a pin $162^1$, extending through the slot $163^1$ (see Figs. 3 and 4) in the standard plate, at the left hand side of the machine.

165 is a compound rocking-arm, loosely journaled on a rod 166, which is secured to the inner side of the standard plate, at the left hand side of the machine. The upper arm 167, of this compound rocking-arm, is provided with a slot 168 in which operates the rod $162^1$ above mentioned. The lower end, 169 of this arm, is normally in contact with a pin 170, secured to the rock-lever 9. This compound arm is connected by a spring 171 to the standard plate A.

A, B, C, D, and E are five upper key rods in this special bank No. 8. These key rods have their pins 5, made longer than the pins in the remaining key rods in this same bank.

As will be seen from Fig. 3, the pin secured to the rod E, normally rests in contact with the rock-lever 9. It will also be seen that these pins are placed at different distances from the rock-lever.

On reference to Fig. 11, will be seen the construction of the special segmental detent used in connection with this bank. This segmental detent is unevenly divided, 173 being the upper portion and 174 the lower portion. The upper portion is operated by the five keys specially mentioned in Fig. 3, and the lower portion by the four keys bearing upon their name-plates, Ch, Pd, Rd, and NS. The object of this divided detent is to enable the keys, operating in combination with each portion of the divided segment, to be operated simultaneously, as is often necessary in operating a machine of this kind.

By means of the divided detent, it will be understood that if any key in the first five keys be operated, and afterward a key in the lower four keys in the bank 8 be operated, that the first operated key will not be unlocked and returned to normal when the hooked end 4 of the last operated key, is engaging with the beveled edge 26 of the lower portion 174 of the detent and opening such detent.

Besides the beveled lug 55, is secured to the slide 53, a beveled lug 175, for the same purpose as the lug 55, and which operates the portion 174, of this special segmental detent. It will be clearly understood that the five rods, shown in Fig. 3, only operate the special type frame 97¹. In this frame are contained the type which designate the clerks in an establishment who operate the machine.

On reference to Fig. 11, it will be seen, that I use a compound arm C⁴, the lower end of which operates in combination with one of the notches B, in the rod 15. This compound arm is pivoted to the same pin 25, which pivots the detents 24 to the plates 14, as will be thoroughly understood from my patent before referred to. The upper ends of the compound arm C⁴, normally rest in contact with each portion of this divided detent. It will be clearly understood, that when a key operating either of the portions of the divided detent, is depressed, the said portion will abut its respective branch of the compound arm C⁴, and operate it for the same purpose as the arms C are operated, in connection with the other detents, as is fully described in my patent before referred to. So, it will therefore be clearly understood, that in the event of keys being locked in position in one portion of the detent, that keys can be locked in position in the other portion of the detent, and operate the arm C⁴, without affecting the locked keys in the other portion of the detent.

I shall now describe the construction of the bearing supports shown in Fig. 7, in which are supported, the ink-pad roller and the feed roller.

The cylinder 138 is supported on its shaft 176 in plates 178, suitably secured on the inside of the machine.

181 are the knurled edges of the cylinder 138.

183 are the bearing supports.

184 is an ink pad suitably journaled by means of the rod 185, in the lower pair of bearing supports. The object of this ink-pad is to ink the surfaces of the electro-plates secured to the periphery of the cylinder 138, so that when the cylinder is revolved, as hereinafter described, the paper, as it passes between the cylinder 138, and the feed roller 186, receives the impressions of the type on its under side, as will be understood.

189 is an annular groove near the outer ends of the rod 185. In this annular groove normally rests a detent 190, suitably pivoted to the frame 178, or the bearing supports. The object of this device which I have just described, is to prevent the rod 185 from becoming displaced. It will be seen that the rod 188 is provided with a similarly constructed groove and detent. As will be seen from the drawings, the rods 185 and 188 project through the slots 189¹ near the lower ends of the bearing supports.

On reference to Fig. 8, will be seen the construction of the bearing supports.

190¹ is a bearing-block, held in the interior of the supports 183, which are hollow for the greater part of their length. Through this bearing block passes a rod 188.

191 is a spring contained in the bearing support between the bearing-block 190¹, and a compression nut 192. It will be seen that by means of this nut, the pressure of the spring 191 against the bearing block 190¹, can be regulated at will, and so consequently increase or decrease the pressure of the ink-pad-roller 184, against the printing-surfaces on the periphery of the cylinder 138, or the pressure of the rubber roller 186, against the printing-surfaces on said cylinder, and the pressure of its knurled disks 187, against the knurled edges 181, of the cylinder 138.

The paper 194 is fed from a suitable supply-roller 193, between the rubber roller 186, and its knurled disks and the knurled edges and printing-surfaces on the periphery of the cylinder 138, as shown in the drawings.

On reference to Fig. 5, it will be seen that when the plunger-rod 133 is depressed, as hereinafter described, that its slide 135, provided with a pawl 136, (see Fig. 1), operating a ratchet 137, secured on the shaft 176 of the cylinder 138, will turn the cylinder 138 and consequently the paper, being firmly held between the rubber roller 186, and the periphery of the cylinder, as before described, will be positively fed into position beneath the printing box Z.

I shall now describe my new means for changing the dating mechanism, contained in the box Z.

198, 199 and 201, are three peculiarly bent operating rods, each provided with a suitable finger button and return spring 202. These rods are held, at their parallel parts, in a suitable bearing 197. The inner ends of these rods are held in position and alinement, by means of the bearing 126¹, to operate the dating mechanism which is fully described in the Sharpe-Banfield patent, 571,098, patented Nov. 10th, 1896. It will be understood that these operating rods are operated merely by depressing them, when their inner ends, being in alinement with suitable ratchets in the printing box Z, will revolve the ratchets and consequently change the date, that will be impressed upon the paper 194, which is in position under the printing box Z.

I shall now describe my means for operating the printing mechanism, shown in Fig. 5. V is an arm pivoted on the inside of the standard plate A, by the same pin l², to which the arm L¹ is pivoted. V¹ is an arm pivoted at v, and provided with a square shoulder v¹. W is a frame provided with a slot W¹, which is wider at its upper end than the diameter of the dead-shaft 82¹, which passes there through. W² is a Z-shaped piece secured to the top of the frame W, by two screws w. w¹ is a lug upon which the Z-shaped piece is supported. I employ this means for regulating the angle at which the lower part w², of the Z-shaped piece W², is placed relatively to the frame W. The way the angle of this Z-shaped piece is regulated, is identical to that employed by me to regulate the pressure of the pieces S, S, upon the plunger-points T¹, before described. Near the lower end of the frame W, and pivoted at z, is a printing box Z, provided with the requisite type Z³ which moves between a suitable guide way Z¹, and the inside of the standard plate. Z² is a platen secured to the lower side of the guide way Z¹ and against which the type Z³ operates. Y¹ and Y² are two spurs forming part of a lever Y, which is journaled on the rod 82¹. 120² is a link connecting the lever Y, at its upper end, to the arm 121¹, pivoted at 122¹. At the lower end of the arm 121¹, is pivoted an inking-pad 123¹, held in a suitable frame 124¹. Through the upper portion of this arm passes an adjusting screw 125¹, which abuts the bearing 126¹. The object of this screw abutting the bearing 126¹, is to regulate the pressure of the pad 123¹, against the type on the under side of the printing box Z. It will be clearly understood, that when I loosen the screw 125¹, the pressure of the pad against the type, will be lessened, and increased when the screw is tightened, as the frame 124¹, being thrown round its pivot 126², in the direction indicated by arrow, will reduce the distance that the pad has to be moved, and consequently increases its pressure against the type. 128¹ is a cam secured to the main shaft 20. This cam is provided with a raised portion 129¹, which is normally in contact with the spur Y¹. 131¹ and 132 are pins secured to the frame W. The plunger rod 133, which is held in suitable bearings 134, is provided with a return spring 139. The slide 135 is provided with a pawl 136, (see Fig. 1).

Having now described the principal parts involved in my invention, I shall describe its operation.

As fully described in the above mentioned patent, the machine must be partially unlocked, by means of one of the five upper keys in the special bank 8. This, as described, will move the arm 11, out of the path of movement of the rod 15. As also described in the before mentioned patent, the keys to be operated, must be depressed before the rod 15 is moved, thereby moving the pin 18 out of the path of movement of the pin 22, and fully unlocking the machine. At the same time the key rod is depressed, and locked in position, as fully described in my patent before referred to, its respective pin 5, abuts the rock-lever 6, and by means of the pin or roller 30, moves the lever 29 around its pivot 29¹. The lever 29, being in contact with a pin 30¹, securing the link 42 to the tooth-segmental rock-lever 31, moves such rock-lever round its pivot 32. At the same time the tooth-segmental rock-lever is thrown backward, the upper portion of the rock-lever 43 is advanced towards the main shaft. The handle is now turned in the direction indicated by arrow, and by means of the cam 89, abutting a pin 92, moves the arm 90, by means of its slot 91, (see Fig. 2), in the direction indicated by arrow. This, as fully described in my said patent, throws the detent 96, out of engagement with the pinion 76¹, thereby leaving the pinion and its connected mechanism, free to be revolved. The shaft continuing to revolve, brings the cam 50 into engagement with the pin 51, thereby raising the sliding plates 33 and the tooth-segmental rock-lever 31, up until the teeth of the said segmental rock-lever, are brought into engagement with the idlers 60 and held in engagement. Simultaneously the above movement is taking place, the sliding plate 33 is raising up the lever 40, and its connected mechanism, the distance equal to the length of the slot 39¹. This brings the rock-lever 43 directly into the path of movement of the cam 45, secured to the main shaft. The main shaft continuing to revolve, brings the cam 45, round, so that it engages with the lever 43, and rocks such arm and the lever 40, round their pivot 39, thereby, through the link 42, forcing forward the tooth-segmental rock-lever 31, and revolving the idlers 60.

It will be seen from the drawing, that the tooth-segmental rock-levers are forced forward to their fullest limit, and stopped by the lower end of the stop X.

When the sliding plates 33 are rising, and bringing the tooth-segmental rock-levers 31, into engagement with the idlers 60, the sliding plates are also pushing against the pieces G, secured to the several arms D, (see Figs. 2 and 9), and are gradually raising them up and disengaging the lugs E, and thereby unlocking the several wheels on the shaft 63, immediately, the tooth-segmental rock-levers 31, are brought into full mesh with the idlers 60. This, it will be seen, leaves the wheels secured to, or on the shaft 63, free to be revolved.

As fully described in my before mentioned patent, the locked key rods are released by means of the beveled edge-pin 59, coming into contact with the beveled edge-pin 58, when the sliding plate 33 is being raised up, thereby raising up the slide 53, whose lug 55, forces the detent 24, out of engagement with the hooked ends of the key rods.

As will be understood from my patent before referred to, the rod 15 has been returned to normal before this operation takes place, so that the notches B, will be in the path of movement of the several arms C, when the detents are being forced outwardly. As soon as the cam 50 escapes by the pin 51, and the cam 45 has passed the upper part of the rock-lever 43, and abutted the square shoulder $44^1$ of such lever, it, with the assistance of the spring 46, forces such lever and its connected mechanism, back to normal. Simultaneously the sliding plate 33 drops back to normal, and restores the toothed-segmental rock-lever 31, and its connected mechanism, also to normal. The idler 60, having been operated by the toothed-segmental rock-lever 31, communicates motion to the gear wheel $64^1$, (see Fig. 2), which in turn operates the idler 78, and this, by means of the intermediate wheels $76^1$ and $76^2$, operates the drive roller 66, by means of its pinion 75. This it will be seen, revolves the drive roller 66, in the direction indicated by arrow, which, by means of its drive pins $t^3$, engaging in holes $t^4$, move the indicator bands, which expose at their proper openings at the front and rear sides of the machine, the amount of the transaction operated. It will now be seen how the indicator bands are moved by the intermediate mechanism before described. On the shaft 63, I have shown six idlers. $64^1$ meshes with the idler 78, connected by the intermediate gearing before described, to the pinion secured to the main drive roller 68. $64^2$ meshes with the idler 78, similarly connected to the pinion secured to the side of the main drive roller 69. These two wheels mesh direct with the main drive rollers. The wheels $64^3$ and $64^4$ are connected together by a sleeve $64^c$. The wheel $64^4$ meshes with the idler 78, which is similarly connected as those before described, to the pinion secured to the side of the main drive roller 67. The wheels $64^5$ and $64^6$ are secured to the shaft 63. The wheel $64^6$ meshes with the idler 78, (see Fig. 1), which is connected by the intermediate gearing, to the pinion secured to the side of the main drive roller 66.

The indicator bands shown in Fig. 1, represent, through suitable openings at the front and rear sides of the machine, on their surfaces, indicia at which the machine may be set when first put up; so consequently I will call this the normal position of the indicator bands.

We will assume that the key No. 9, in the cent bank $P$, has been depressed, and as before described the toothed-segmental rock-lever 31, will be thrown backward, and by the operation of the handle 21 and the parts before described, will mesh with the idler 60, which is in mesh with the gear wheel $64^5$, communicating motion to the wheel $64^6$, and such wheel, by means of the idler 78, intermediate idlers $76^1$ and $76^2$, will communicate motion to the pinion 75, secured to the side of the main drive-roller 66, turning such drive-roller in the direction indicated by arrow, far enough to move the indicator bands, operating with this roller, to represent at their proper openings in the machine, the amount of the transaction operated. The wheel $64^3$ transfers motion to the wheel $64^4$, and it in turn to the main drive-roller 67, in the same way as those before described.

When the indicator bands have been operated, the cam 89, comes in contact with a pin 93, and moves the arm 90 in the opposite direction, bringing the detent 96 into engagement with the idler $76^1$, in sufficient time to prevent any possibility of the main indicator roller 66, turning the indicator band too far, and not represent the proper indicia at its respective opening.

It will be understood that when the cam 50 has released the pin 51, that the sliding-frame 33, will fall back to normal, and consequently the arms D will be forced by their respective springs H, also back to normal. When in this position, the arms D do not engage with the lugs E, because the gear wheels on the shaft 63, having been turned by the means before described, have moved the lugs E round with them too. While in this position, the main drive rollers are locked by the detent 96, as above described.

When a new transaction is to be recorded, the indicator bands must be returned to normal, before they will represent on their surfaces, the amount of the new transaction, and when returned to normal, they are locked by the arms D, in the manner before described.

I shall now describe how the motion is transferred from one indicator band to another, by means of the pinions secured to, or on the shafts 79 and 80.

We will suppose that the main drive roller 66, is being revolved; the pinion $81^h$ meshes with the pinion secured to the side of this drive roller, (see Fig. 12), and being secured to the same shaft 80, as the pinion $81^e$, revolves this pinion, which, being in mesh with the pinion secured to the side of the secondary drive roller 73, revolves this drive roller in the same direction, and through the same distance as the main drive roller 66. This operation of course, as it will be understood, revolves the indicator bands at the same time, which represent at their respective openings, the amount of the transaction.

The pinion $81^g$ meshes with the pinion secured to the side of the main drive roller 67, and being secured to the same sleeve 82, as the pinion $81^f$, revolves such pinion, which, being in mesh with the pinion secured to the side of the secondary drive roller 72, revolves this drive roller in the same direction, and through the same distance as the main drive roller 67, so as to expose on the indicator bands, at their respective openings, the amount of the transaction operated.

As will be understood from this specification, the mechanism that I have just described, for transferring motion from the main sets of drive rollers, 66 and 67, to the secondary sets of drive rollers, 72 and 73, is identical to that employed by me in my before mentioned patent, for transmitting motion from the main sets of indicator wheels to the secondary sets of indicator wheels. The operation of the pinions secured to, or on the shaft 79, in transferring motion from the main sets of drive rollers, 68 and 69, to the secondary sets of drive rollers, 71 and 70, is identical to that above described in connection with the pinions secured to, or on the shaft 80.

During the operation of moving the indicator bands, the type frames 97, (see Fig. 4), which are in constant mesh with the geared portion of the wheels 101, loosely journaled on the main shaft, are moved a sufficient distance by the wheels 200, which are in constant mesh with the wheels 101, to bring the type bars which represent the key or keys depressed, in a position to print on the check and detail slip. This operation is fully explained in my patent before referred to. I only mention it here, so that it will be understood, that the connecting mechanism operating between the type-frames and the indicator bands, is identical in my present, and the above mentioned patent.

I shall now describe the operation of the special type-frame 97$^1$, which is operated by the first five keys in bank number 8, before mentioned. It will of course be remembered that any one of the key-rods (A, B, C, D, and E) in Fig. 3 must be depressed before the machine can be unlocked, as before mentioned. When one of these key-rods is depressed, its respective pin engages with the rock-lever 9, whose pin 170 engaging with the arm 169, will throw the arm 167 in the direction indicated by arrow, and consequently move the type-frame 97$^1$, and bring the type-bars, which represent the key depressed, into position to be operated upon by the rectangular plunger. Immediately this operation just described has taken place, the cam L, on the main shaft 20, is moved out of engagement with the projection 162 on the arm 159, which arm will be forced forward by the spring 161, far enough to engage the tooth shaped lug 163, with its proper notch in the serrated rack 158. This it will be seen, holds the special type-frame 97$^1$, in position. After the type-bars in this special type-frame have been operated upon, the cam L, engages with the projection 162, and disengages the tooth shaped lug 163 from the rack 158, when the type-bar 97$^1$, is brought back to normal by means of the spring 171 operating the arm 167. It will of course be understood that the key-rod, which was used to operate this type-frame, has been returned to normal when the operation described takes place.

I shall now describe my means for depressing the type-bars in the respective type-frames that have been brought into position to be operated upon.

When the type-frames, corresponding to the banks in which keys have been depressed, have brought the proper type-bars under the rectangular plungers O$^4$, (see Figs. 3, 4 and 6) the cam L on the main shaft 20, revolving in the direction indicated by arrow, comes against the roller $i^1$, and moves the rocking-frame I round its pivot $i$, throwing its forward end downwardly, and by means of the plunger points T$^1$, depressing the rectangular plunger O$^4$, which in turn presses the type upon the ribbon which will print upon the paper. On reference to Figs. 3 and 4, it will be seen that when the rocking-frame I, is moved, round its pivot, the pin $j$, on the arm I$^1$, will move the link arm K, and communicate motion to the rocking-frame J, which will be moved round its pivot $l$, and operate upon the type in identically the same way as the rocking frame I, above described.

When the cam L, has passed by the roller $i^1$, the rocking-frames are returned to normal by their springs O$^5$, bearing against the bearing-block O$^6$, it being remembered that the projections or extensions O$^3$, in which the springs O$^5$, are placed, are part of the rectangular plungers.

Now as regards the operation of the machine shown in Figs. 1 and 5. The main shaft 20, moves the cam 128$^1$, round, and in revolving, its raised portion 129$^1$, abuts the spur Y$^1$, and forces the arm Y round on the shaft 82$^1$, until gradually it assumes the position shown in dotted lines. It will be clearly understood that by means of the link 120$^2$, the arm 121$^1$, will move round its pivot 122$^1$, and cause the inking-pad-frame 124$^1$, to assume the dotted position shown. Immediately after the inking-pad-frame 124$^1$, has been moved out of contact with the type, the cam 128$^1$, engages with the pin 131$^1$, secured to the frame W, drawing such frame down and also depressing the printing box Z. This frame W, is carried down in a straight line until the piece $w^2$, abuts the top of the arm V, when the frame is tilted round into dotted position shown. It will be noticed that the upper end of the slot W$^1$, is enlarged, so that when the frame W, is tilted round by the Z-shaped piece W$^2$, the said frame moves until it takes up the dotted position shown in this figure.

By means of the enlarged portion of the slot W$^1$, I am enabled to move the frame W, when the Z-shaped piece abuts the arm V, a greater distance than if I made the slot the exact size of the diameter of the shaft 81$^2$;

for in this latter case, the frame W would not get the same amount of play on the shaft 82¹, and depress the printing-box Z, down far enough to print. It is this extra distance that I obtain when enlarging the slot, that causes the printing box to descend far enough to print, when the piece $w^2$, abuts the arm V. It will be understood that the box, as it is now situated (see Fig. 5) will print upon the detail slips. To continue the operation. The cam 130¹, secured to the main shaft 20, moves out of engagement with the arm V¹, which is moved up into the dotted position by the plunger-rod 133.

On reference to Fig. 1, it will be seen that the plunger-rod 133, moving up, raises its slide 135, up far enough to allow its pawl 136, to engage with the next tooth of the ratchet wheel 137. The cam 130¹, still continues to revolve and in proper time engages with the arm V¹, and forces it down upon the plunger-rod 133 whose slide 135, having its pawl 136, in engagement with the next tooth on the ratchet wheel 137, forces such wheel round and consequently revolves the cylinder 138. The cam 128¹, still revolving, comes in contact with the pin 132 (shown down a little farther in dotted position) and raises the frame back to normal. When the pin 132, is ascending, it engages with the spur $Y^2$, on the arm Y, and forces such arm and its connecting mechanism back to normal.

When I desire to prevent the mechanism shown in Fig. 5, and the rocking-frame J, from printing, I move the arm L¹, into the dotted position shown in this figure. This it will be seen, brings the lower end of the arm V, into contact with the square shoulder $v^1$, and throws its upper end out of the path of movement of the piece $w^2$. When in this position, the printing box before mentioned, will not print because the arm L¹, being moved and locked in position by its catch O¹, will, by means of the slot in its extended portion L², engaging with the pin $l^3$, throw the link-arm K, out of engagement with the pin $j$, and consequently when the cam L, moves the rocking-frame I, it will not communicate motion to the rocking-frame J. It will now be understood why the rocking-frame J, does not operate when the arm L¹, is moved into dotted position.

Now, as regards the printing-box Z. The arm V, being in the position above mentioned, will not obstruct the piece $w^2$, when it descends, so consequently the cam 128¹, will move the frame W, down in a straight line but not to print, because the frame W, has not been tilted round into dotted position. When the cam 130¹, moves out of engagement with the arm V¹, the said arm cannot move upwards because the arm V, (shown in dotted position) is in engagement with its shoulder $v^1$, so when the cam 130¹, again, comes in contact with the arm $v^1$; it forces such arm against the plunger-rod 133, which, on account of the arm V¹, not being able to move into its upper position, merely draws its slide 135, back and forth on the same tooth on the ratchet wheel 137, and consequently does not revolve the cylinder 138.

As before described, the mechanism connecting the type-frames 97, with the drive rollers on the shaft 65, is identical to that connecting the type-frames 97, with the indicator wheels, fully described in my patent before referred to. So, it will be understood, that when the cam 112 (see Fig. 4) abuts the roller 156, thereby moving the rock-lever 110 in the direction indicated by arrow, whose pin 113, extending into the path of movement of the distributed type-frames 97, abuts such type-frames and returns them to starting position. It will therefore be seen, that the type-frames and indicator bands are returned to normal, in identically the same manner as are the type-frames and indicator wheels, described in my patent above mentioned.

By means of my new mechanism for indicating the amount of the transaction registered by the machine, on what I call the indicator bands, driven from the main sets of drive rollers, loosely journaled on the dead shaft 65 and extending, as will be seen on reference to Fig. 2, round the idler rollers loosely journaled on the dead shafts 76, 151 and 152, I am enabled to do away with the momentum that was necessarily generated when I used the indicator wheels as described in my patent before referred to. There is practically no momentum at all when I use these indicator bands, and consequently the parts operating the said bands, between the main shaft and the drive rollers, and the mechanism for transferring motion from the main sets of drive rollers to the secondary sets of drive rollers, will operate more accurately and will not be liable to be sprung, and throw the parts out of alinement, as was the case, I found from practice, in the other machine.

It will be seen from this specification, that my improvements overcome the disadvantages experienced in my patented machine before referred to.

What I claim as my invention is:

1. In a cash register, the combination with a series of indicators having gears attached thereto for actuating the same, of a prime actuator for giving said indicators different degrees of movement, a train of gearing intermediate said prime actuator and said indicators for transmitting movement to the latter; a locking device for the first mentioned indicator gears; and a second locking device for engaging and locking said train of gearing in proximity to said prime actuator.

2. In a cash register, the combination with an operating mechanism, of a single bank of keys divided into groups; a differentially movable member common to and controlled by all of the keys of said bank; independent detents for the different groups of keys of said bank; and a single tripping device controlled by said operating member for operating all of said detents.

3. In a cash register the combination with an operating mechanism of a bank of keys divided into groups, independent detents for the different groups of keys and a single tripping device for operating said detents.

4. In a cash register the combination with an operating mechanism, of a bank of keys arranged in independent groups, a detent for each group and a locking means common to each detent for locking the same after the movement of the operating mechanism has commenced.

5. In a cash register the combination with an operating mechanism, of a bank of keys divided into independent groups, a detent for each group, a shaft which must be moved to unlock the operating mechanism and a device common to both of the detents for locking the same when the shaft is so moved.

6. In a cash register the combination with a printing mechanism, of an operating slide for the same arranged to have a reciprocating and a rocking motion to effect the printing and means for preventing the rocking motion at will whereby the printing is suspended.

7. In a cash register the combination with a printing mechanism including an operating slide, of means for reciprocating the slide, a projection mounted on said slide, means engaging said projection for rocking the slide and thereby effecting the printing movement, and means for adjusting said projection to regulate the extent of said rocking.

8. In a cash register, the combination with an operating member, and a printing mechanism including a platen, of platen operating means controlled by said operating member; and a relatively stationary projection positioned to be engaged by said platen operating means to deflect the normal direction of movement of the same and thereby move the platen to full printing distance.

9. In a cash register, the combination with an operating mechanism and a printing mechanism, of a feeding mechanism comprising a feed actuator, a spring for retracting said actuator, means connected with the operating mechanism for moving said feed actuator against its spring tension to cause the feed, and means for independently maintaining said actuator under its spring tension whereby to discontinue the feed by preventing the normal extent of movement of said actuator.

10. In a cash register the combination with an operating element mounted on a movable member, of a driven member mounted independently of the same and a locking device for the driven member arranged to be operated by the movable member when the driven member and operating element are brought together.

11. In a cash register the combination with an operating segment mounted on a slide of an operating gear with which said segment coöperates and a lock for said gear operated by the movement of the slide.

12. In a cash register, the combination with an operating member, and a printing mechanism including a strip feeding device, of means connected with the operating member for reciprocating said strip feeding device; and hand adjustable means for blocking said strip feeding device to prevent its effective reciprocatory movement during the attendant movement of the operating member.

13. In a cash register the combination with a series of keys, of a movable member operated differentially thereby, an independently mounted lever engaged by the movable member, and an operating segment mounted independently of and actuated by said lever.

14. In a cash register indicator and recorder, the main shaft, a series of settable toothed segmental rock levers, a series of finger key rods, operating the same to advance the toothed segmental rock levers, a series of finger keys, a rotary shaft, a series of drive rollers connected to the said main shaft, two series of oppositely arranged indicator bands suitably supported in the frame of the machine and operated by the said drive rollers and deriving their advance movement through their respective drive rollers, main shaft and toothed segmental rock levers, a reciprocating printing mechanism connected to the said main shaft to impart therethrough a retrograde movement to the said bands the printing frames and means for operating said printing frames as and for the purpose specified.

15. In a cash register indicator and recorder, a series of banks of keys and key rods, a main rotary shaft, a plurality of indicator bands, independent sets of guiding rollers for each of said bands, a reciprocating printing mechanism, a set of drive rollers, deriving their initial movement from the said printing mechanism through the main shaft, and their ultimate movement from the main shaft, a rock lever connected to said printing mechanism and a special bank of keys and key rods connected to said rock lever to operate same as and for the purpose specified.

16. The combination with a series of drive-rollers and movable indicator bands, in sets of two, and means for transmitting motion from the main sets to the secondary sets, a shaft 63 having gears thereon and intermediate gear between the drive-rollers and the gear on the shaft 63; a rod 82¹ of arms journaled thereon, lugs on the said shaft designed to be locked by the said arms, as set forth and for the purpose specified.

17. In combination with the key-rods in bank number 8, of the plate 14 a divided segmental detent pivotally secured to the same having its locking edges normally held in the path of movement of the key-rods, slide 53, lugs on such slide, said slide operated as described, for simultaneously operating both divisions of said detent, as set forth and for the purpose specified.

18. In combination with the key-rods in bank number 8, and the divided detent operating therewith and supported as described, of the slide 53 operating therewith, compound arm C⁴, pivoted as described, operated by both divisions of said detent, rod 15 with notch in the path of movement of the lower end of said compound arm, all arranged as set forth and for the purpose specified.

19. The combination with the main shaft, cam 128¹, and arm V, of centrally slotted frame W, provided with an adjustable piece at its upper end, pin 131¹, on such frame, all designed to operate the frame and its connected mechanism, as set forth and for the purpose specified.

20. The combination with the main shaft, cam 130¹, arm V, and plunger-rod 133, and its connected mechanism, of the arm V¹, provided with a square shoulder v¹, all arranged as set forth and for the purpose specified.

21. In a cash register indicator and recorder, the combination with the main shaft 20 and the shaft 82¹, of a cam supported on said main shaft, a tilting arm Y supported on the shaft 82¹, said cam being designed to come in contact with the lower portion of said arm Y to tilt the upper portion of said arm forwardly, a rectangular slotted frame supported on the main shaft 20 and shaft 82¹, a depressible printing mechanism connected to the lower portion thereof, a pin thereon designed to come in contact with the arm Y to tilt it in the opposite direction and means for operating said frame in a vertical direction as and for the purpose specified.

22. In combination, the indicators, the shaft 63, the gears carried thereby, the main shaft, the sliding plate operated therefrom, locking arms having an engagement with the hubs of said gears, and plates carried by said arms located in the path of the sliding plate, substantially as described.

23. In combination, the main shaft, the sliding plates 33 operated thereby, the locking arms D having engaging slots, the shaft 63, the gears carried thereby, lugs projecting from the hubs of said gears and plates secured to said arms extending into the path of the plates 33, substantially as described.

24. In combination with the main shaft, cam L, and rectangular plungers O⁴, of the rocking-frames I, and J, each provided with a central slot O², plunger points T¹, having bearing in the said rocking-frames, adjustable pieces S, screws s, and lugs T, all arranged as and for the purpose specified.

25. In a cash register, the combination with an operating member, and a printing mechanism including a platen, of platen operating means controlled by said operating member; a relatively stationary projection positioned to be engaged by said platen operating means to deflect the normal direction of movement of the same and thereby move the platen to full printing distance; and manipulative means for adjusting said relatively stationary device out of the path of engagement with said platen operating means whereby to prevent the full printing movement of said platen.

26. In a cash register, the combination with an operating member, and a printing mechanism including a platen, of platen operating means controlled by said operating member; and a hand adjustable device arranged to be projected into or withdrawn from the path of movement of said platen operating means whereby to change the nature of the movement of the latter and thus control the operation of the platen.

27. In a cash register, the combination with an operating member, and a printing mechanism including a platen, of a reciprocatory paper feeding device operated by said operating member; and manipulative means for simultaneously disabling said reciprocatory feeding device and said platen.

28. In a cash register, the combination with an operating member, and a printing mechanism including a platen, of platen operating means controlled by said operating member; a relatively stationary projection positioned to be engaged by said platen operating means to deflect the normal direction of movement of the same and thereby move the platen to full printing distance; a paper feeding device; and manipulative means for simultaneously disabling said paper feeding device and adjusting said relatively stationary device out of the path of engagement with said platen operating means whereby to prevent the full printing movement of said platen.

29. In a cash register, the combination with an operating member, and a printing mechanism including a platen, of platen operating means controlled by said operating member; a relatively stationary projection positioned to be engaged by said platen operating means to deflect the normal direction of movement of the same and thereby move the platen to full printing distance; a paper feeding device having a reciprocatory actuator operated by said operating member; and a manipulative device for adjusting said relatively stationary projection out of the path of engagement with said platen operating means, and into the path of engagement with said reciprocatory feed actuator whereby to prevent the full operative movement of said platen and also to prevent the effective reciprocation of said feeding device.

30. In a cash register, the combination with a main operating member, of a reciprocatory operating arm actuated by said operating member; a platen carried by said operating arm; and a relatively stationary projection engaging said reciprocatory arm to give the latter a rocking movement in addition to its reciprocatory movement and thereby control the total extent of the reciprocatory movement of said platen.

31. In a cash register, the combination with an operating member, a series of keys, type carriers controlled by said keys, means for feeding a check strip across said type carriers, and a reciprocatory platen for said type carriers operated by said operating member; of an auxiliary reciprocatory platen also operated by said operating member and coöperating with auxiliary type carriers for printing upon said check strip simultaneously with the printing by the said key controlled type carriers; and manipulative means for simultaneously preventing the full reciprocatory movements of said platens and also preventing the operation of said feeding means.

32. In an adding-machine, a plurality of setting means, a plurality of keys to operate each setting means, a register normally disconnected from said setting means, and operating means for connecting and disconnecting the setting means and register and operating the register by returning the setting means.

33. In an accounting machine, the combination with an accounting device, of a setting member therefor; a plurality of manipulative means for positively imparting differential setting movements to said setting member; means for establishing an operative connection between said setting member and said accounting device; and means for restoring said setting member to normal position while such connection is established.

34. In an accounting machine the combination with an accounting device, of a setting member therefor; a series of keys for positively imparting differential setting movements to said setting member; a latch for retaining said keys in operated position; means for establishing an operative connection between said setting member and said accounting device; means for restoring said setting member to normal position while such connection is established; and means for unlatching said keys prior to such restoration.

35. In an accounting machine the combination with an accounting device, of a setting member therefor arranged to have differential setting movements; means for controlling such differential movements of said setting member; means for moving said setting member and thereby establishing an operative connection between it and said accounting device; means for restoring said setting member to normal position while such connection is established; means for normally locking said accounting device; and means for moving the locking means from said accounting device prior to the movement of restoration of said setting member.

36. In an accounting machine, the combination with accounting devices, of a plurality of segmental racks for actuating the same and arranged to have differential movement for such purpose; manipulative amount determining means for controlling such differential movements to determine the extent of the same; means for simultaneously moving said racks into engagement with the accounting devices; and means for restoring the racks to normal position while they are in such engagement with the accounting devices, whereby to transmit the differential movements of the racks to the accounting devices upon such restoration.

37. In a registering machine, the combination with a counter actuating segment rack arranged to have differential setting movements, of a counter; means for moving the rack into engagement with the counter; means for controlling said differential movements of the rack in one direction while the rack is disengaged from the counter; and means for restoring the rack to normal position while the engagement is established between the rack and the counter.

38. In a registering machine, the combination with a register actuating segment rack having a pivotal bearing, of a counter; means for shifting said pivotal bearing to effect an engagement between said rack and said counter; amount determining manipulative means for causing the rack to be set in one direction to any desired extent of differential movement; and means for restoring the rack to normal position while the aforesaid engagement is established between the rack and the counter.

39. In a registering machine, the combination with a plurality of gear pinions and their corresponding gear segments, said segments being mounted on pivotal bearings upon which they may turn relatively to said pinions; of means for simultaneously shifting all of said segments in the planes of their pivotal movement whereby to cause the same to engage their respective gear pinions; means for controlling the pivotal movements of said segments to permit differential movements thereof; and means for restoring said segments to normal position while they are in engagement with their pinions.

40. In an accounting machine, the combination with an accounting device, of an operating element therefor, a series of keys for moving said element to different extents, means for bringing the accounting device and operating element together, and means for restoring said element to normal and thereby entering the transaction on said accounting device.

41. In a machine of the class described, the combination with a row of keys arranged in groups, a detent for each group, a common means for releasing the detents, each key being also constructed to release the detent of its group.

42. In a machine of the class described, the combination with a row of keys arranged in groups, an independent detent for each group, each key operating the detent for the group only, and a common means for releasing all the detents.

43. In a machine of the class described, the combination with registering and printing mechanism, of an operating element having two racks, a series of keys for moving said element to different extents, means for connecting the racks to said registering and printing mechanism respectively, and means for restoring said element to normal position while such connection exists.

44. In a machine of the class described, the combination with a plurality of banks of keys, of a printing mechanism controlled as to position by one of said banks but independently operated, a second printing mechanism directly operated by another of said banks, and means for taking an impression from said printing mechanisms.

45. In a machine of the class described, the combination with a bank of value keys and a bank of special keys, of a printing device positively operated directly from said special keys, a printing device having its motion determined by said value keys, means independent of said keys for moving said second printing device, and a platen for taking impressions from both said devices.

46. In a machine of the class described, the combination with an accounting device, of a bank of keys, means for latching said keys when depressed, an element differentially set by said keys, actuating devices for said accounting device moved by said element, means for returning said element to normal and thereby transferring the transaction to the accounting device, and means for releasing the latch for the keys before said element is returned.

47. In a machine of the class described, the combination with a bank of keys divided into groups, of a printing mechanism, means for controlling same from only one of said groups, and an indicating mechanism controlled by either group.

48. In a machine of the class described, the combination with a row of keys comprising a plurality of groups, separate detents for each group of keys, and a common means for releasing said detents, a main operating mechanism with means controlled by one group only of said keys for locking said operating mechanism and a printing device controlled by one only of said groups of keys.

JOHN SHARPE.

Witnesses:
EGERTON R. CASE,
OSCOR GROUL.